Feb. 2, 1960           A. R. BEHNKE           2,923,793

REGULATOR FOR AUTOMOTIVE ELECTRICAL SYSTEMS

Filed Nov. 27, 1957           5 Sheets-Sheet 1

Inventor
Albert R. Behnke
By
Attorney

Feb. 2, 1960 A. R. BEHNKE 2,923,793
REGULATOR FOR AUTOMOTIVE ELECTRICAL SYSTEMS
Filed Nov. 27, 1957 5 Sheets-Sheet 2

Inventor
Albert R. Behnke
By
Attorney

Feb. 2, 1960     A. R. BEHNKE     2,923,793
REGULATOR FOR AUTOMOTIVE ELECTRICAL SYSTEMS
Filed Nov. 27, 1957     5 Sheets-Sheet 3

Inventor
Albert R. Behnke
Attorney

Feb. 2, 1960 — A. R. BEHNKE — 2,923,793
REGULATOR FOR AUTOMOTIVE ELECTRICAL SYSTEMS
Filed Nov. 27, 1957 — 5 Sheets-Sheet 4

Inventor
Albert R. Behnke
By [signature]
Attorney

Feb. 2, 1960 A. R. BEHNKE 2,923,793
REGULATOR FOR AUTOMOTIVE ELECTRICAL SYSTEMS
Filed Nov. 27, 1957 5 Sheets-Sheet 5

Inventor
Albert R. Behnke ated Feb. 2, 1960

United States Patent Office 2,923,793

2,923,793

REGULATOR FOR AUTOMOTIVE ELECTRICAL SYSTEMS

Albert R. Behnke, Fond du Lac, Wis.

Application November 27, 1957, Serial No. 699,248

10 Claims. (Cl. 200—95)

This invention relates to regulators for automotive and similar electrical systems incorporating a storage battery and a generator that may be driven over a wide range of speeds, and the invention refers more particularly to a device of the type comprising generator voltage and current regulators and a battery cutout.

A regulator device is an important element of every conventional automotive electrical system, and its malfunctioning can have serious and costly consequences. Such devices are relatively expensive, and in most cases have heretofore been so constructed that any failure or malfunction of one of the parts, however small or inexpensive, has necessitated replacement of the entire device. Moreover, on any such regulator device several different adjustments have to be made from time to time, and each of those adjustments should be made with great accuracy and precision; but nevertheless the regulators heretofore available have usually been difficult to adjust, and this fact has aggravated the possibility of malfunctioning.

Although regulators for automobile electrical systems have been standard automotive equipment for many years, having been described and depicted at least as early as 1925 in section XXII of "Automotive Electricity," by Earl L. Consoliver, the above described defects and disadvantages have persisted all during that time.

By contrast with this long standing past practice, it is a general object of this invention to provide an electrical regulator device of the character described, comprising voltage and current regulator units and a battery cutout, which device, although no more expensive to manufacture than similar regulators heretofore known, is nevertheless capable of being adjusted much more easily and accurately than past regulators, and moreover has its elements so arranged that any component of the device which is susceptible to malfunctioning or failure through wear is readily replaceable.

It is another important general object of this invention to reduce the cost of the electrical regulator to the automobile owner, and since adjustment is an important step in manufacture and/or installation of a regulator device, and proper adjustment can very substantially prolong the useful life of the device, it follows that it is an object of this invention to accomplish this reduction in regulator cost by providing a regulator in which all of the necessary adjustments can very readily be made.

In this connection, it is a specific object of this invention to provide an electrical regulator of the character described wherein biasing force is applied to each of the armatures by a leaf spring, and wherein the biasing force of the leaf springs, as well as the contact clearance at each of the pairs of fixed and movable contacts, may be readily adjusted by screw threaded means, rather than by the inexact bending of parts which has been necessary for the adjustment of past regulators.

In this same connection, it is another object of this invention to provide a regulator of the character described having readily accessible manually operable switch means for shorting across the fixed and movable contacts of the voltage regulator to facilitate accurate adjustment of the current regulator.

Another specific object of this invention is to provide a regulator device for automotive electrical systems, wherein the current regulator, voltage regulator and battery cutout units each has an armature subassembly that comprises an electromagnetically responsive armature, a hinge element whereby the armature is swingably mounted on the frame member, a contact reed, and a leaf spring by which the armature is biased in one direction, and wherein the hinge connection between each of said armature subassemblies and the permeable frame member on which it is mounted is readily detachable, so that said subassembly may be readily replaced when necessary.

It is also an object of this invention to provide a regulator device of the character described in which the current regulator and voltage regulator units each comprises a solenoid wound around a permeable core, a frame partially embracing the solenoid, and an armature swingable toward and from one end of the core, wherein a magnetic shunt for bypassing magnetic flux around the air gap between the core and the armature of the voltage and current regulators supports a contact hanger and an abutment against which an armature bias spring reacts.

A further object of this invention is to provide a regulator for automotive electrical systems, of the type comprising the conventional electromagnetically controlled voltage regulator, current regulator and battery cutout units, each having a solenoid wound around a permeable core, a frame embracing the solenoid, and an armature hinged to the frame, wherein each armature and the biasing spring and contact reed carried thereby is readily removable from the frame, and wherein each solenoid and its associated core are also readily removable, to thus permit quick and easy replacement of any part of the regulator which might be worn out through long service.

Another of the objects of this invention is to provide a regulator of the character described wherein laterally balanced forces are applied to the armatures of each of the voltage regulators, the current regulator and the battery cutout units, and thus to the contactor reed carried by each of said armatures, so as to insure correct and accurate alignment of the fixed and movable contacts, thus obviating the possibility of side thrust upon the movable contacts to thereby insure long life of the contacts.

In consonance with the general object of this invention of providing an electrical regulator having a long useful life, it is a specific object of this invention to provide a regulator wherein long contact life is achieved, as set forth in the preceding statement of object, and wherein long life of the leaf spring which biases each armature is also assured by reason of the fact that the armature biasing springs carry no current and therefore are not subject to electrolytic corrosion.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
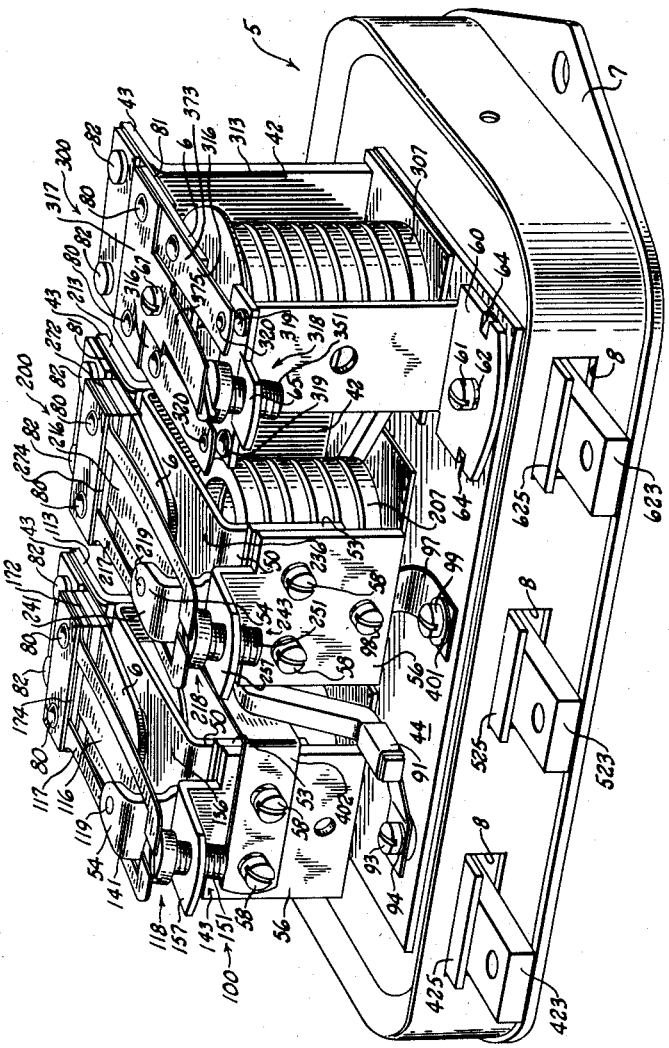
Figure 1 is a front perspective view of the regulator of this invention with the cover removed.
Figure 2:
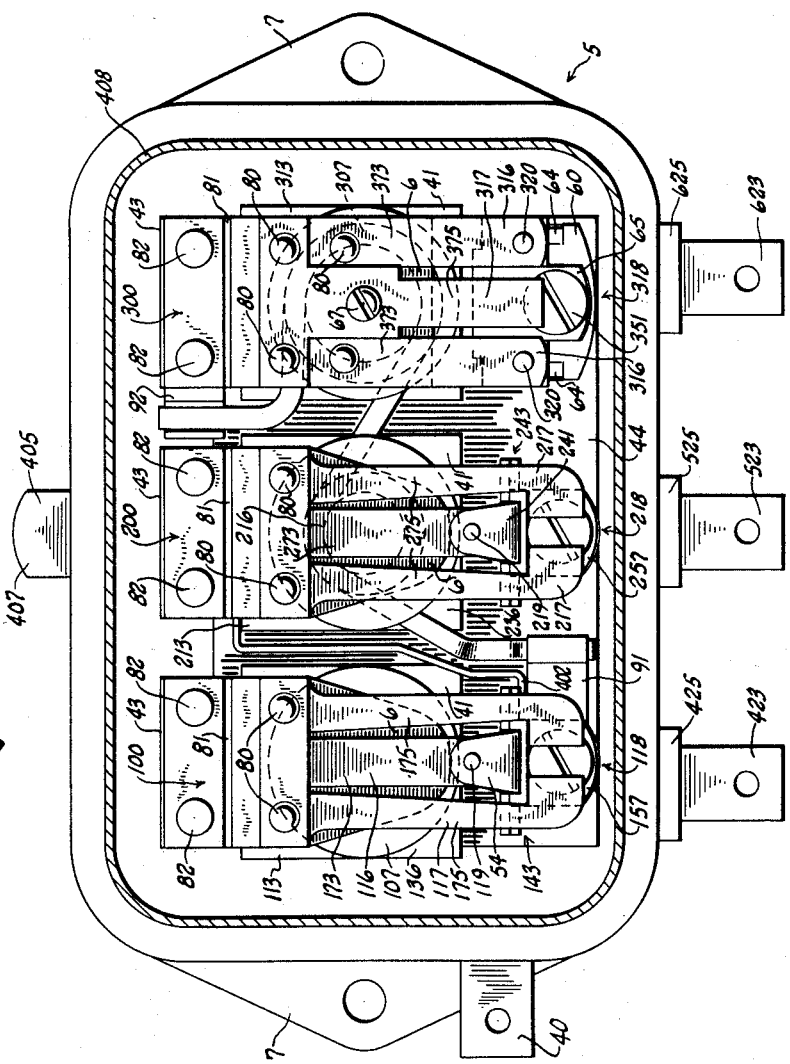
Figure 2 is a plan view of the regulator.
Figure 3:
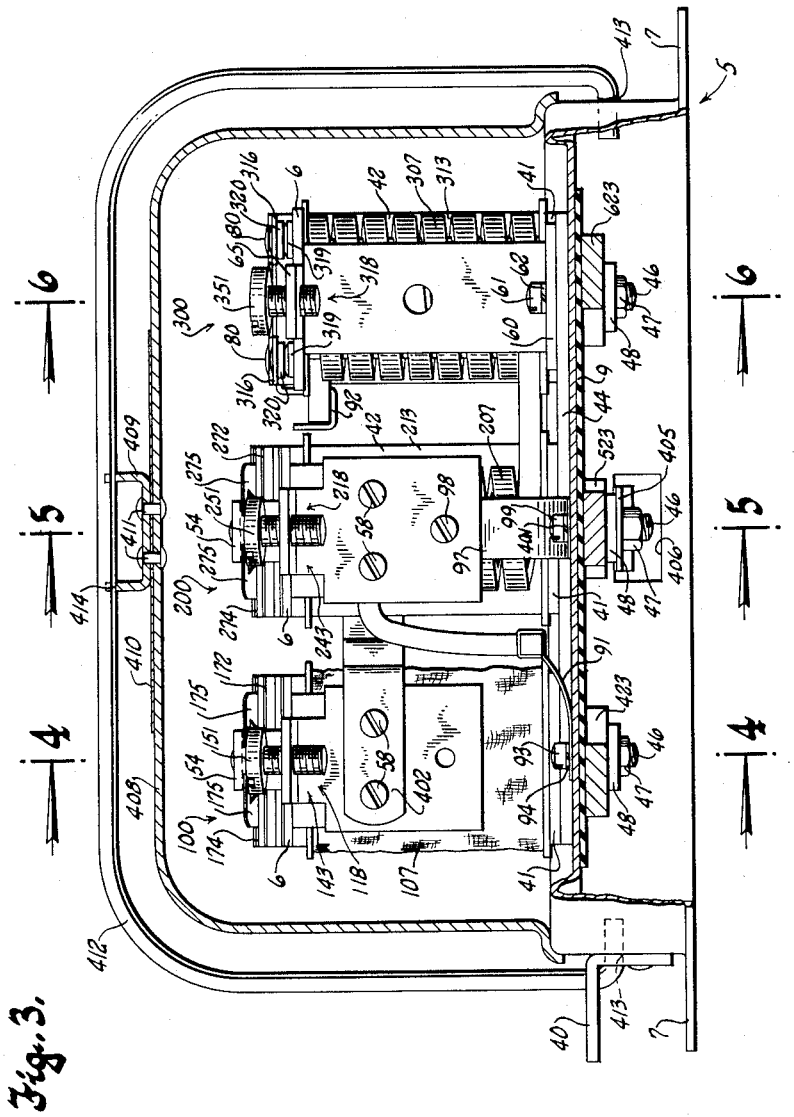
Figure 3 is a front elevational view of the regulator with portions of the cover and base broken away and shown in section.
Figure 7:
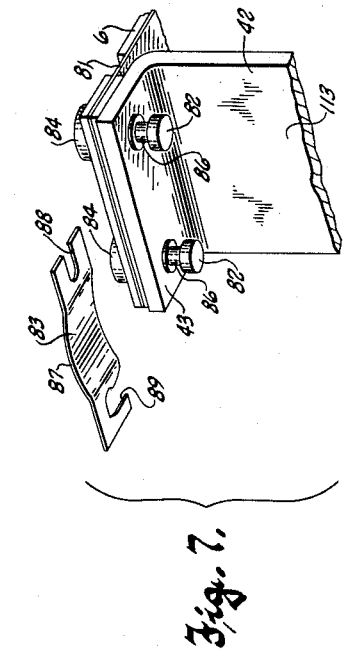
Figure 7 is a fragmentary perspective view of the connection between one of the armatures and the frame in which it is mounted.
Figure 5:
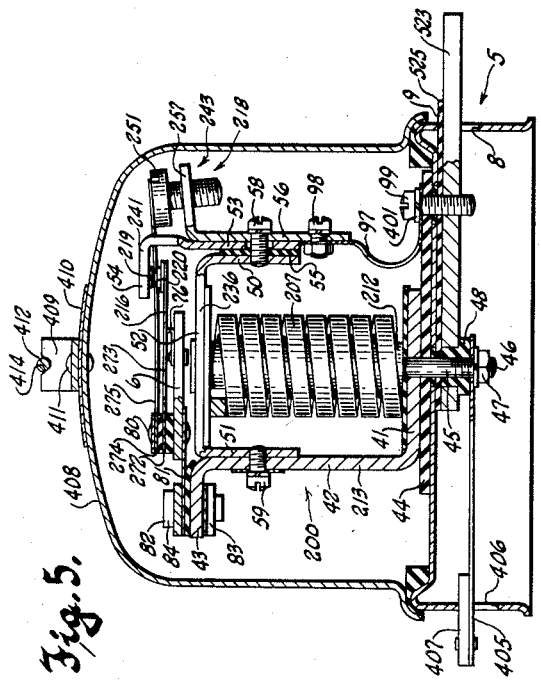
Figure 5 is a vertical sectional view taken on the plane of the line 5—5 in Figure 3, showing the current regulator unit.
Figure 4:
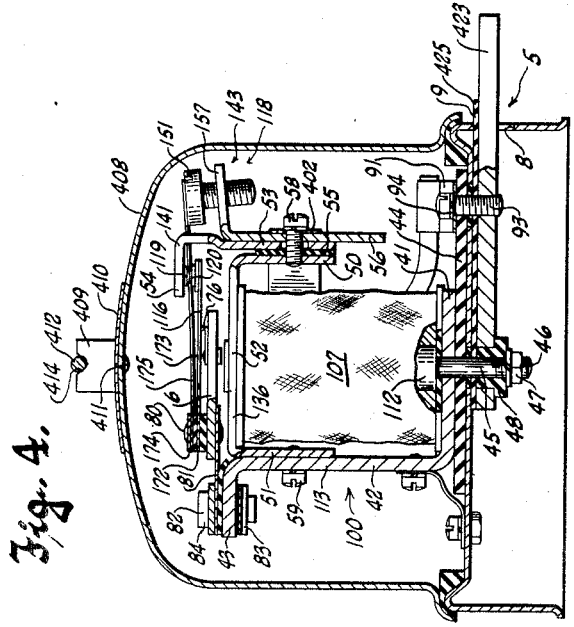
Figure 4 is a vertical sectional view taken on the plane of the line 4—4 in Figure 3, showing the voltage regulator units.
Figure 8:
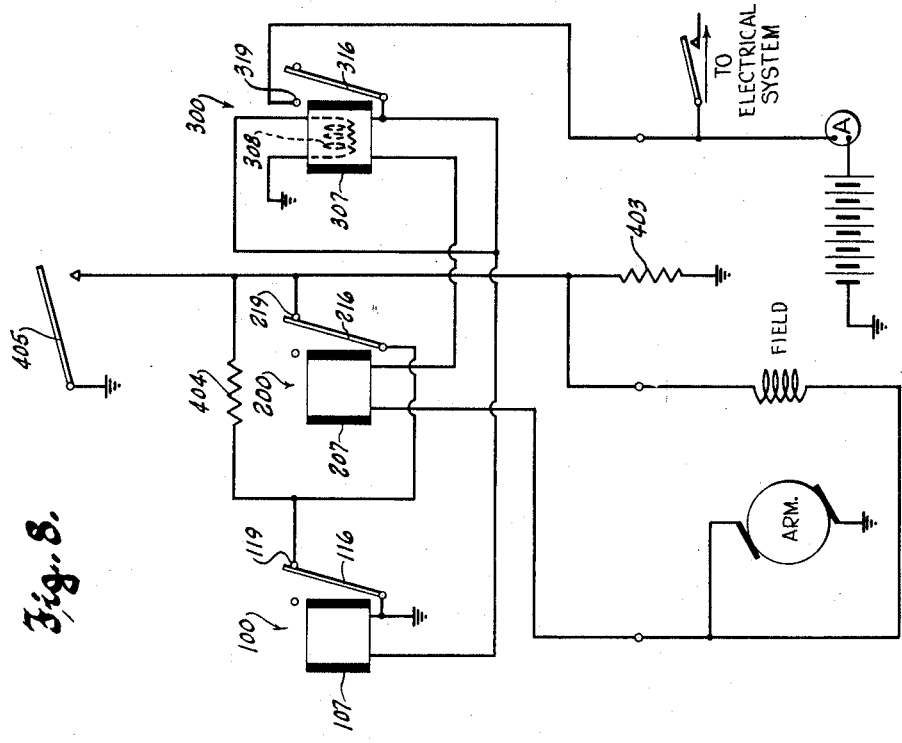
Figure 8 is a circuit diagram showing the connection of the regulator of this invention in an automotive electrical circuit.
Figure 6:
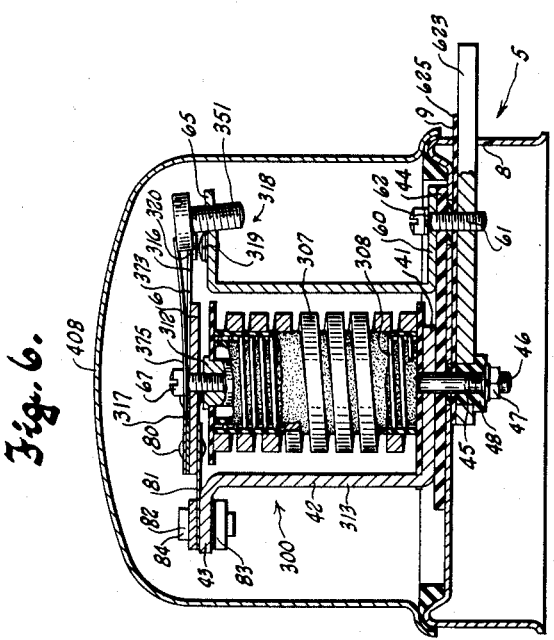
Figure 6 is a vertical sectional view taken on the plane of the line 6—6 in Figure 3, showing the battery cutout unit.

Referring now to the accompanying drawings, the numeral 5 designates generally a base upon which are mounted the several components of the regulator of this invention, which comprise, in general, three units, namely a voltage regulator 100, a current regulator 200 and a battery cutout 300. In the following description, reference numerals prefixed by 1 designate parts of the voltage regulator, numerals prefixed by 2 designate parts of the current regulator, and those prefixed by 3 designate parts of the cutout unit.

Each of the units comprises a permeable core member 112, 212, 312; and at least one coil or winding is wound around each core member, the windings for the voltage regulator and current regulator being respectively designated 107 and 207, while the two windings of the battery cutout are designated 307 and 308. Each of the units has a permeable frame member 113, 213, 313 that partially embraces its winding or windings. Hingedly mounted on each permeable frame member is a permeable armature 6, the three armatures being substantially identical with one another, and the armatures carry flexible contactor reeds 116, 216, 316, each of which carries a movable contact 120, 220, 320 cooperable with a fixed contact 119, 219, or 319 on its respective unit. The armatures also carry leaf springs 117, 217, 317, which cooperate with fixed abutments 118, 218, 318, and by which each armature is biased away from the adjacent end of its core.

The base 5 of the device is an inverted pan and is substantially rectangular in plan view, with mounting ears 7 projecting laterally from the bottoms of its opposite end walls. Underlying the base and projecting forwardly through apertures 8 in its front wall are terminals 423, 523 and 623, which are connectable to terminals of the generator armature, generator field and battery, respectively of a conventional automotive electrical system. The terminals may comprise identical straight strips of metal, insulated from one another and the base by means of a lower insulator plate 9 interposed between the several terminals and the underside of the base.

The insulator plate 9 has short tabs 425, 525 and 625, each of which projects forwardly through one of the holes 8 in the front wall of the base and bears indicia identifying the terminal that underlies it. Such identification of the tabs avoids the necessity for referring to indicia on the cover during installation of the device and permits the use of identical terminal strips 423, 523 and 623; and the tabs also serve to prevent inadvertent short circuiting engagement between conductors connected to the terminal strips and the base.

Secured to one end wall of the base is a grounding clip 40 for connection of a grounding conductor (not shown) which insures good electrical connection between the base of the regulator and a grounding connection on the frame of the generator in an automobile in which the regulator is installed.

The three permeable frame members 113, 213, 313 are substantially identical, each having a forwardly extending base leg 41 which underlies its associated winding, an upright leg 42 disposed alongside the winding, and a rearward projection 43 at the top of the upright leg to which the armature is hingedly connected as hereinafter described. The forwardly extending base leg 41 of each of the three permeable frame members is insulated from the base by an upper insulator plate 44 of fibre board or the like which overlies the upper surface of the base.

Each of the permeable cores 112, 212, 312 has a reduced diameter lower portion 45 defining a downwardly facing circumferential shoulder that bears against the base leg of the frame member, and the lowermost portion of each core is threaded, as at 46, to receive a nut 47 by which the core is held in place. The reduced diameter lower portion of each core extends down through aligned holes in the base leg of the permeable frame member, the upper insulator plate, the base, the lower insulator plate, and one of the terminals, so that the core and the nut secured thereto hold all of these members securely assembled in superimposed relationship. An insulating bushing 48 in the hole through each terminal insulates the terminal from the core.

The frame around the voltage and current regulator windings also includes a magnetic shunt 136, 236 which conducts a portion of the flux from the upright leg 42 of the permeable frame member directly to the core 112, 212, bypassing flux around the air gap between the armature and the core in order to decrease the pull of the winding on the armature. The magnetic shunt is made of an iron alloy which has the characteristic that its permeability decreases with increasing temperature, hence the presence of the magnetic shunt causes the flux density across the air gap to increase with increasing temperature, and therefore the voltage and current regulator units tend to open at lower generator outputs when temperature rises.

Each magnetic shunt 136, 236 is inverted U-shaped, having front and rear downwardly extending leg 50 and 51 and a horizontal bight portion 52. To assure a good flux path through the magnetic shunt from the permeable frame member to the core, the upper portion of the core projects through the bight portion of the shunt member with a snug fit, and the rear leg 51 of the magnetic shunt flatwise overlies the inner face of the upright leg 42 of the permeable core member and is secured thereto by means of screws 59 extending through holes in said upright leg and engaged in threaded holes in the magnetic shunt. The front leg 50 of each magnetic shunt provides a mounting for a contact hanger 141, 241 and for an abutment member 143, 243.

The contact hangers 141, 241 for the voltage and current regulator units are substantially L-shaped, each having an upright leg 53 which flatwise overlies the outer face of the front leg 50 of the magnetic shunt, and each having a rearwardly extending leg 54 which overlies the contactor reed 116, 216 and upon which one of the stationary contacts 119, 219 is mounted in a position to be engaged by the movable contact 120 and 220 on the contactor reed. Interposed between the magnetic shunt member and the contact hanger is a small insulator plate 55.

Each of the abutment members 143, 243 is L-shaped and has an upright leg 56 which overlies the upright leg 53 of the contact hanger. Each abutment member has a forwardly extending leg 157, 257 in which is threadedly engaged a screw 151, 251, the head of which provides the abutment 118, 218 against which the armature bias spring 117, 217 reacts to bias the armature away from the solenoid core.

The contact hanger and abutment member are secured to the front leg of the magnetic shunt by means of screws 58 (preferably of insulating material) extending through the upright legs of the contact hanger and abutment member and threaded into the magnetic shunt. The screws pass through vertically elongated slots in the upright leg of the contact hanger, and the latter may therefore be adjusted up and down, when the screws are loosened, to provide for adjustment of the gap which exists between the fixed and movable contacts when the armature is in its lowermost position, attracted to the core. Adjustment of the abutment screw 151, 251 up or down will of course increase or decrease the biasing force exerted upon the armature by the leaf spring 117, 217 and correspondingly vary the response of the armature to the current through the solenoid. Preferably the abutment screws are made of insulating material, such as nylon, but they may be made of metal and received in insulating bushings in the abutment member.

In the case of the battery cutout unit, which has no magnetic shunt, the abutment member 318 extends upwardly from the upper insulator plate and has a forwardly extending leg 60 at its bottom which overlies said insulator plate and by which the abutment member is supported. A conductive screw 61 through said leg 60 secures the abutment member 318 in place and extends downwardly through the insulator plates and base and is threaded into the lower terminal strip. A split-ring type lock washer 62 under the head of the screw not only insures against rotation of the screw but also maintains the screw under substantially constant tension, despite variations in ambient temperature, thus assuring a good conductive path between the abutment member 318 and the terminal strip 623 under all conditions.

Downwardly angled tangs 64 on the forwardly extending base leg of abutment member 318 engages in holes in the upper insulator plate to prevent rotation of said abutment member. At its top the abutment member 318 has a forwardly projecting leg 65 in which is threadedly engaged a screw 351, the head of which provides the armature spring abutment. The screw 351 of course provides for adjustment of the tension of the upward biasing force exerted upon the armature by the leaf spring 317, as in the case of the abutment screws 151 and 251 on the voltage and current regulators, and like them is preferably made of insulating material. The fixed contacts 319 of the battery cutout are also mounted on the forwardly projecting leg 65 of the abutment member, spaced to opposite sides of the screw 351.

Coaxially threaded into the upper end of the battery cutout core 312 is a stop screw 67, the head of which overlies the upper face of the armature biasing spring, directly above the armature, to provide an adjustable stop by which the raised position of the armature is defined, and which thus determines the gap between the battery cutout contacts in the raised position of the armature.

It will now be seen that all adjustments of armature bias and contact gap in the device of this invention may be very precisely accomplished without any need for the inaccurate bending of parts which heretofore has usually been necessary in the adjustment of devices of this type.

Long life of the contact points in each of the units is assured by reason of the fact that laterally balanced forces are applied to each armature so that the movable contact or contacts carried thereby will always squarely engage the cooperating fixed contact or contacts. In the case of the voltage and current regulators, the contactor reed 116, 216 is a substantially T-shaped member of flexible metal having its crossbar 172, 272 flatwise overlying and secured to the armature near the rear thereof and having its stem portion 173, 273 lengthwise centered along the armature and projecting lengthwise forwardly beyond the front end of the armature.

The bias springs 117 and 217 in the voltage and current regulator units are substantially U-shaped, each having its bight portion 174, 274 overlying the crossbar of the contactor reed and its arms 175, 275 extending forwardly from the armature and spaced equal distances to opposite sides of the contactor reed. At their free front ends the spring arms 175, 275 are curved toward one another so that both can engage the head of the abutment screw 118, 218. The small space between the adjacent ends of the spring arms permits a screwdriver to be engaged in the slot in the head of the abutment screw so that the latter can be adjusted. It will be seen that the two spring arms apply equal upward biasing forces to the armature at equal distances to both sides of the contactor reed.

In the case of the battery cutout, the relationship between the armature biasing leaf spring 317 and the contactor reed 316 is the reverse of that in the voltage and current regulators, in that the leaf spring 317 is T-shaped, with a single forwardly extending arm 375 centered lengthwise along the armature, while the contactor reed member is substantially U-shaped with two arms 373 projecting forwardly from the armature, one on each side of the leaf spring, and each of which has a movable contact 320 mounted near its free end. Each of the movable contacts 320 cooperates with a fixed contact 319 on the abutment member 318.

The rivets 80 which secure the leaf springs and contactor reeds to their respective armatures also secure to each armature a flexible hinge plate 81 which extends rearwardly from the armature to overlie the rearward projection 43 on the permeable frame member and to be detachably secured thereto. The rivets 80 may be made of insulating material, such as nylon, or alternatively may be insulated from the leaf springs 117, 217, 317 by suitable insulator means, but in either event the springs 117, 217 of the voltage and current regulators are insulated from the contact reeds so that they carry no current. The advantage of this is that the passage of current through a spring tends to promote corrosion and pitting of it, decreasing its life and, more importantly, changing the amount of biasing force which it exerts upon the armature.

To damp out undesirable fluttering of the free ends of the contactor reeds 116, 216 of the voltage and current regulators, a small L-shaped abutment 76 is secured to the upper face of the armature, with one leg flatwise overlying the same and its other leg extending upwardly and engaging the underside of the reed near the front of the armature.

A pair of studs 82 extend downwardly through aligned holes in each hinge member and the rearward frame member projection 43 therebeneath, and the two studs are securely but readily detachably held in place by means of a clip 83. Each stud has a large head 84 and has a circumferential groove 86 near its lower end in which a portion of the clip is adapted to engage. The clip is an elongated strip of spring metal, medially bowed upwardly, as at 87, and having a slot 88 opening to one end thereof and a slot 89 opening to one side edge near its other end. The width of the slots 88 and 89 is such that their marginal edge portions can closely engage in the circumferential grooves in the studs. In installing the clip, the portion thereof having the slot 88 is swung around said stud to bring its sidewardly opening slot 89 into engagement with the groove in the other stud. The bowed portion 87 of the clip engages the underside of the rearward projection of the frame with a substantial biasing force whereby the end portions of the clip are urged downwardly to hold the studs against axial displacement and rotation of the clip is prevented.

The windings 207 and 307 of the current regulator and battery cutout carry all of the current which flows from the generator armature to the electrical circuits of the automobile, and they are therefore wound of heavy wire such as bus bar. They are connected in series with one another, being preferably wound from a single piece of wire, one end of which is connected in series with one side of the generator armature through the terminal 423 and a clip 91 and the other end of which is connected to a clip 92 on the frame of the battery cutout. When the contacts 316 and 320 of the battery cutout are closed, the generator armature is thereby connected, through the windings 207 and 307, with the battery and with the other units of the electrical system, such as the ignition, horn and headlight circuits, such connection to the electrical system being provided for by means of the terminal 623. (It will be recalled that terminal 623 is connected with fixed contacts 320 through the abutment member 318 and conductive screw 61.)

Coaxially wound on the core of the battery cutout is a voltage responsive coil 308. The flux field produced by coil 308 is reinforced by the field produced by the coil 307 when the generator output exceeds battery voltage, but the flux field produced by coil 308 is opposed by the field produced by coil 307 when the generator output is less than battery voltage. Consequently the movable contacts 316 are forced away from fixed contacts 320 when the generator output is below a value at which the generator will charge the battery, and the generator is cut out of the circuit, but said contacts close when the generator output comes up to a value at which the battery will charge. The voltage responsive winding 308 has one end connected to the clip 91 and its other end grounded, to thus have the voltage of the load circuits impressed across it.

The clip 91 is directly connected to the armature terminal 423 by means of a conductive screw 93 which extends downwardly through said clip and through the insulator plates and base to have its lower end portion threaded into the terminal strip 423. As in the case of the screw 61, a split ring type of lock washer 94, under the head of the screw, holds it under constant tension, regardless of temperature change, thus assuring a good connection between the clip and terminal strip regardless of temperature changes. The contact hanger 241 of the current regulator is connected with the generator field connection terminal 523 by means of a strap 97, secured by a screw 98 to the lower portion of said contact hanger. A screw 99 extends through the strap and through the base and insulator plates and has its lower end portion threaded into the terminal 523 to complete the connection. A lock washer 401 under the head of the screw 99 assures maintenance of a good electrical connection between the strap and the terminal.

Connected in parallel with the voltage responsive winding 308 of the cutout is the voltage regulator winding 107, one end of which is connected to the clip 92 and the other end of which is grounded. Thus the current through the voltage regulator winding will always be proportional to the voltage impressed upon the load circuits. The contact hanger of the voltage regulator is connected with the permeable frame member of the current regulator (and thus with the contactor reed thereof) by means of a substantially Z-shaped connector link 402, the rear leg of which overlies the upright leg of the current regulator frame member 213 and is secured thereto by the same screws 59 that secure the magnetic shunt to it, while the front leg of the link flatwise overlies the contact hanger 141 and is secured thereto by the same screws 58 which secure the contact hanger to the front leg of the magnetic shunt. On the underside of the base are mounted resistors 403 and 404. The resistor 403 permits limited current flow to the generator field when either the current regulator contacts or the voltage regulator contacts are open. The resistor 404 is shunted across the current regulator contacts and permits limited current flow to the generator field when the current regulator contacts are open and the voltage regulator contacts are closed.

Since the contacts of the voltage regulator and current regulator are connected in series with one another, through the connector link 402, the current regulator cannot be properly adjusted unless it is known that the voltage regulator contacts are not vibrating, that is, are closed. Heretofore adjustment of the current regulator has for this reason been a difficult task, with the result that the necessary close adjustment was not always attained. However, the regulator of this invention includes a switch 405 connected to short across the contacts of the voltage regulator and thus assure that all regulation of field excitation current will take place through the current regulator. This switch can be connected in any of several ways (all of which will be readily understood by those skilled in the art), depending upon the internal connections in the regulator device, but in the embodiment here illustrated the switch 405 comprises a strip of flexible metal secured at one end to the bottom of the core 212 of the current regulator and having its front end portion projecting through an aperture 406 in the rear wall of the base. The free end portion of the strip is biased upwardly and has an insulating strip 407 overlying its upper surface so that there can be no electrical connection between the switch strip and the base until the switch is manually depressed. The insulating strip 407 also provides a handle by which a person making adjustments to the current regulator can hold the switch down. After the adjustments have been made, the switch may be released and it will automatically swing upwardly out of engagement with the grounded base, in response to its own bias.

A cover 408 fits over the base to enclose the three units comprising the regulator device. At its top the cover has a U-shaped clip 409, which overlies the name plate 410 and is secured to the top wall of the cover by rivets 411. Upwardly opening notches 414 in the legs of the clip 409 receive a bail 412 by which the cover is readily removably held in place on the base, the ends of the bail being engaged in holes in the end walls of the base, as at 413.

From the foregoing description taken together with the accompanying drawings, it will be readily apparent that this invention provides a regulator device for automotive and similar electrical systems which can be adjusted much more easily and accurately than previous devices of the same type, and in which all parts that are subject to wear, or to possible malfunction as a result of failure of other units of the electrical system in which the device is installed, are readily replaceable.

What is claimed as my invention is:

1. A regulator for controlling the output of an electrical generator, of the type which comprises a solenoid wound around a permeable core, a permeable frame member having angularly disposed arms one of which extends across one end of the solenoid and the other of which extends along one side of the solenoid, an elongated armature hingedly mounted at one end on said other arm of the frame member and extending across the other end of the solenoid for swinging motion toward and from the adjacent end of the core, a leaf spring carried by the armature and projecting beyond its free end, a movable contactor carried by the armature, and a magnetic shunt member fixed across said other end of the solenoid and connected to the core and the frame member to provide a flux path in parallel with the flux path through the armature: said regulator being characterized by the fact that said magnetic shunt member is substantially U-shaped and has one of its legs secured to said other arm of the frame member to be supported thereby and connected in magnetic circuit therewith and has its bight portion in contact with the core at said other end of the solenoid; further characterized by a contact hanger secured to the other leg of the magnetic shunt member and on which is mounted a fixed contactor adapted to be engaged by the movable contactor upon swinging of the armature in one direction; and further characterized by a bracket secured to said other leg of the magnetic shunt and having thereon an abutment against which the free end of said leaf spring bears to yieldingly bias the armature away from the adjacent end of the core.

2. The regulator of claim 1, further characterized by the fact that said abutment on the bracket is provided by an adjusting screw threaded into the bracket and against one end of which said leaf spring bears so that the biasing force which the leaf spring exerts upon the armature may be regulated by adjustment of said screw.

3. The regulator of claim 1, further characterized by the fact that the contact hanger comprises a member having an upright leg, and on which is mounted a fixed contact engageable by the movable contactor; and further characterized by the fact that the upright leg of the contact hanger is secured to said other leg of the magnetic shunt member, flatwise overlying the same, by means of a screw threaded into the shunt member and extending through a lengthwise extending slot in the contact hanger, whereby the contact hanger is adjustable in substantially the directions of armature movement to permit adjustment of the gap between the fixed and movable contacts when the same are separated.

4. A device for controlling the output of an electric generator, of the type comprising a solenoid, a frame partially embracing the solenoid, an armature having one end hingedly mounted on the frame and extending across one end of the solenoid for swinging motion of its free end portion toward and from said end of the solenoid, a fixed contact mounted on the frame, and a movable contact carried by the armature and engageable with the fixed contact when the armature is in one position of its swinging motion: said device being characterized by a pair of spring blades carried by the armature and projecting endwise beyond the free end of the armature, one on each side of the movable contact; and further characterized by means on the frame providing an abutment upon which both of said spring blades rest to bias the armature away from the adjacent end of the solenoid with a force which is uniformly distributed across the width of the armature and is substantially equal at both sides of the contact.

5. The device of claim 4, further characterized by the fact that said spring blades are insulated from the armature and from the fixed and movable contacts so that they carry no current.

6. In an electromagnetic device of the type comprising a solenoid, a frame partly embracing the solenoid, an armature having one end hingedly mounted on the frame and extending across one end of the solenoid for swinging motion of its free end portion between a position spaced from said one end of the solenoid and a position adjacent thereto, and fixed contact means mounted on the frame and adapted to be engaged by a movable contactor carried by the armature: a first spring blade element carried by the armature and projecting endwise beyond the free end thereof, said first spring blade element comprising a single strip of resiliently flexible metal; a second spring blade element carried by the armature and projecting endwise beyond the free end thereof, said second spring blade element comprising a pair of elongated spring arms, one at each side of the first spring blade element and laterally spaced equal distances therefrom; contact means on the free end portion of one of said spring blade elements engageable with said fixed contact means in one of said positions of the armature; and abutment means on the frame engaged by the free end portion of the other spring blade element and against which said other spring blade element reacts to exert biasing force against the armature to urge the latter away from said one end of the solenoid.

7. The device of claim 6, further characterized by the fact that said abutment means comprises the head of a screw threaded into a fixed portion of the frame and adjustable to regulate the biasing force exerted upon the armature by the spring blades.

8. A regulator for controlling the output of an electric generator, of the type comprising a solenoid wound around an upright permeable core, a permeable frame member having a lateral arm underlying the solenoid and an upright arm alongside the solenoid, an armature, a hinge connection between the armature and the upright arm of the frame member mounting the armature across the upper end of the solenoid for swinging motion toward and from the upper end of the core, a movable contactor carried by the armature, and a magnetic shunt member connecting the permeable frame member and the upper end of the core to divert some of the flux generated by the solenoid around the air gap between the armature and the core: said regulator being characterized by the fact that the permeable core projects downwardly through a hole in said lateral arm of the permeable frame member and has its bottom portion threaded to receive a nut by which it is held detachably assembled to the frame member; and further characterized by the fact that the magnetic shunt member has a horizontal leg overlying the top of the solenoid and a downwardly projecting leg flatwise overlying the upright arm of the permeable frame member, at the side thereof adjacent to the solenoid; and further characterized by a screw extending through a hole in said upright arm and threaded into the downwardly projecting leg of the magnetic shunt member to detachably secure the magnetic shunt member to said upright arm of the permeable frame member so as to permit ready removal of the solenoid and core from the frame.

9. The regulator of claim 8, further characterized by the fact that said upright arm of the permeable frame member has a lateral extension at its upper end; further characterized by the fact that said hinge connection between the armature and the upright arm comprises a flexible strip having one end portion secured to the armature and its other end portion flatwise overlying said lateral extension; and further characterized by the fact that said other end portion of the hinge strip is detachably secured to the lateral extension by means of a pair of studs extending through aligned holes in said strip and the lateral extension and each having an enlarged head at one end and a circumferential groove near its other end, and a spring clip having slots near its ends engaged in the grooves in said studs and medially bowed to exert biasing force on said studs by which displacement of the clip and the studs is prevented.

10. The regulator of claim 8, further characterized by the fact that the magnetic shunt has a second downwardly projecting leg at the side of the solenoid remote from the first; and further characterized by the fact that said second downwardly projecting leg has a contact hanger detachably secured thereto, upon which is mounted a fixed contact engageable by the movable contactor carried by the armature.

References Cited in the file of this patent
UNITED STATES PATENTS

| | | |
|---|---|---|
| 1,311,459 | Patten | July 29, 1919 |
| 1,981,681 | True | Nov. 20, 1934 |
| 2,519,093 | Zoerlein | Aug. 15, 1950 |
| 2,617,907 | Umbarger et al. | Nov. 11, 1952 |
| 2,723,323 | Niemi | Nov. 8, 1955 |
| 2,728,033 | Robinson et al. | Dec. 20, 1955 |
| 2,760,140 | Crumbiss | Aug. 21, 1956 |
| 2,777,984 | Menzel | Jan. 15, 1957 |
| 2,840,768 | Bolles et al. | June 24, 1958 |